United States Patent
Laubach et al.

[11] Patent Number: 6,075,972
[45] Date of Patent: *Jun. 13, 2000

[54] CATV NETWORK AND CABLE MODEM SYSTEM HAVING A WIRELESS RETURN PATH

[75] Inventors: Mark Laubach, Mountain View; Paul Baran, Atherton, both of Calif.

[73] Assignee: COM21, Inc., Milpitas, Calif.

[*] Notice: This patent is subject to a terminal disclaimer.

[21] Appl. No.: 09/130,842

[22] Filed: Aug. 7, 1998

Related U.S. Application Data

[63] Continuation of application No. 08/810,407, Mar. 4, 1997.

[51] Int. Cl.[7] .................................................. H04N 7/173
[52] U.S. Cl. ............................................. 455/5.1; 348/12
[58] Field of Search ............................. 455/5.1, 6.1, 4.2, 455/6.2, 6.3, 3.1; 348/6, 7, 12, 13; H04N 7/10, 7/16, 7/173, 7/20

[56] References Cited

U.S. PATENT DOCUMENTS

| | | | |
|---|---|---|---|
| 4,494,138 | 1/1985 | Shimp | 358/86 |
| 4,509,073 | 4/1985 | Baran et al. | 358/86 |
| 4,675,863 | 6/1996 | Paneth et al. | 370/50 |
| 5,142,690 | 8/1992 | McMullan et al. | 455/6.1 |
| 5,377,255 | 12/1994 | Beasley | 379/58 |
| 5,394,559 | 2/1995 | Hemmie et al. | 455/5.1 |
| 5,421,030 | 5/1995 | Baran | 455/5.1 |
| 5,437,052 | 7/1995 | Hemmie et al. | 455/5.1 |
| 5,471,474 | 11/1995 | Grobicki et al. | 370/85.2 |
| 5,481,546 | 1/1996 | Kinkins | 370/95.1 |
| 5,528,582 | 6/1996 | Bopeep et al. | 370/24 |
| 5,534,913 | 12/1996 | Majeti et al. | 348/7 |
| 5,555,015 | 9/1996 | Aguayo, Jr. et al. | 348/6 |
| 5,586,121 | 12/1996 | Moura et al. | 370/404 |
| 5,613,191 | 3/1997 | Hylton et al. | 455/3.1 |
| 5,870,134 | 2/1999 | Laubach et al. | 348/12 |

*Primary Examiner*—Chris Grant
*Attorney, Agent, or Firm*—Wagner, Murabito & Hao LLP

[57] ABSTRACT

A two-way CATV network having a radio return path. A cable headend controller is used to control downstream as well as upstream communications over the two-way CATV network. Downstream signals are sent to subscribers' cable modems through conventional coaxial cables. On the upstream side, a signal generated at a first frequency by an interactive cable modem. This signal is then sent to a transmitter appliqué, which converts the signal to a second frequency. The signal is then transmitted through a wireless segment at this second frequency to a receiver appliqué. The receiver appliqué converts the transmitted signal into a third frequency. In some cases, the third frequency is the same as the third frequency. Eventually, the upstream signal is sent to the headend controller. Throughout the entire upstream transmission process, the same signal is maintained; only its frequency is changed. In the various embodiments, the first, second, and third frequencies are the same; the first frequency is the same as the third frequency but not the second frequency; and the first channel can be the same as the third channel but is not the same as the second channel.

5 Claims, 9 Drawing Sheets

CATV NETWORK AND CABLE MODEM SYSTEM HAVING A WIRELESS RETURN PATH

This is a continuation of copending application Ser. No. 08/810,407 filed on Mar. 4, 1997, now U.S. Pat. No. 5,870,134 which is hereby incorporated by reference to this specification which designated the U.S.

FIELD OF THE INVENTION

The present invention relates to an over-the-air upstream path for data transmission on a cable TV system. In particular, the present invention relates to converting standard one-way cable systems into a two-way system by converting the upstream subscriber's cable signal and transmitting this same signal as different frequencies in one or more upstream mediums.

BACKGROUND OF THE INVENTION

Currently, conventional coaxial cable TV systems can deliver tens of megabits per second data transmissions downstream (i.e., from the headend unit to various subscribers). Also presently feasible is the use of diplexing amplifiers and reverse amplifiers to transmit information upstream (i.e., from one or more subscribers back to the headend unit) on the common coaxial cable as well. However, to activate this reverse channel entails a major fixed cost of adding amplifiers and filters and balancing the upstream gain. If there are many customers for the new two-way services, then the cable operator's investment in activating the two way capability can be justified. However, if there are but relatively few scattered upstream services customers, then the cable operator faces a significant fixed cost to activate the two way capability that cannot be fully amortized over the few customers. This is a "chicken and egg" type problem. On the one hand, the desired solution requires access before the market can be proven, but the access comes at the expense of an often unacceptable front end cost.

In an effort to mitigate cost, various systems have been proposed in which distinct, separate paths were established for downstream versus upstream communications. The use of a separate telephone line return for the upstream cable subscriber signals is well known and is used in a number of different cable modems. The idea of heterodyned frequency translation per se is also old art. And the use of frequency translation in cable systems is probably best developed in the RAD concept used to transmit PCS signals over a cable system. The RAD concept includes the use of inexpensive antennas and frequency shifters as a two way delivery mechanism to remote PCS devices. Over-the-air, two-way signals from cordless Personal Communications Service telephones, say at 1800 MHz from a number of remote antenna sites are frequency shifted and carried to and from one or more central sites.

Although these alternative prior art systems offer some degree of flexibility and enhanced functionalities, they nonetheless suffer from several disadvantages. Today, only 10–15% of the cable plants have been converted to two-way operation. Where telephone lines are used for upstream transmission, the upstream paths are seriously bandwidth limited. And with such approaches, a different protocol is needed in the upstream which requires implementation of different additional hardware at both the cable TV headend and at the subscriber's premises. Scalability and upgradeability were also potential problems with some prior art systems. In addition, there might be serious compatibility issues to be overcome.

Alternative prior art in wireless telephony does include treatment of multiple receiver antennas but used only in a two-way wireless telephony where synchronous transmission is required over the wireless links such that time synchronization and signal formats are compatible with traditional telephony time-slot interchange trunk systems. These systems do not predict the use of a one-way transparent wireless paths in cable television upstream distribution systems for the support of asynchronous packet transmission, nor do they predict the transparent behavior of this invention in that cable modems located on both wired and wireless paths may be simultaneously received on the same upstream channel by a headend cable modem controller.

Alternative prior art in asymmetric cable modem systems universally have restricted the upstream wireless link to a single cable modem channel. These systems suffer both from scaling issues and from restricting deployment in geographic locations to situations where RF signal propagation is only favorable to a few solutions thereby restricting broad deployment needed for a successful cable modem business. These systems do not predict the need for multiple receiver antenna sites and subsequent selection and packet duplication avoidance issues required to meet low cost, nor do they predict the transparent behavior of this invention in that cable modems located on both wired and wireless paths may be simultaneously received on the same upstream channel by a headend cable modem controller, nor do they predict the need for simultaneous carriage of multiple cable modem upstream channels needed to scale to deployment size needed for viable business.

In light of these limitations of the prior art, there exists a need in the cable industry for an efficient, transparent, and cost-effective approach for converting standard one-way cable systems into two-way systems. The present invention provides a solution whereby a transparent radio return path is used for providing upstream communications, which allows cable operators to be able to selectively upgrade their systems on an as-needed basis. Costs are minimized by leveraging the same frequency, scheduling, and modulation schemes to keep the conversion from the radio path signal to the signal on the cable as simple and straightforward as possible.

SUMMARY OF THE INVENTION

The present invention pertains to a two-way CATV network having an upstream return path which includes a signal-transparent wireless radio segment. A cable headend controller is used to control downstream as well as upstream communications over a one-way, partially two-way, or fully two-way CATV network. In one embodiment, downstream signals are sent to subscribers' cable modems through conventional coaxial cables. On the upstream side, a signal is generated at a first signal on a first channel by an interactive cable modem. The first signal is then set to a transmitter appliqué, which converts the first signal and the first channel to a second signal and second channel suitable for transmission through a wireless, over-the-air medium to at least one receiver appliqué. The receiver appliqué converts the second signal and second channel to a third signal on a third channel which is received and processed by the head-end controller. In some cases, the first signal is the same as the third signal. In other cases, the first signal, the second signal, and the third signal are the same.

Furthermore, in some cases, the first channel is the same as the third channel.

The first embodiment of this invention provides a two-way cable system in which a portion of the upstream path includes a transparent wireless radio path such that the headend controller receives the upstream signals from a cable modem as if the cable modem were directly attached to a wired path. Further, it is an object of this first embodiment to provide for the head-end controller to receive signals on an upstream channel from both wired cable modems and wireless cable modems.

The second embodiment of this invention provides a wireless return system which incorporates the use of multiple receiver appliqués, such that duplicate packets are removed in the headend controller when a transmission from a single cable modem is received simultaneously by more than one receiver appliqué.

The third embodiment of this invention provides a wireless return system which incorporates the use of advanced transmitter appliqués and advanced receiver appliqués, such that at most one advanced receiver appliqué receives and processes the upstream signal from a cable modem, such that a duplicate packet suppression function is not required.

BRIEF DESCRIPTION OF THE DRAWINGS

The operation of this invention can be best visualized by reference to the following drawings.

DETAILED DESCRIPTION OF THE INVENTION

Figure 1:
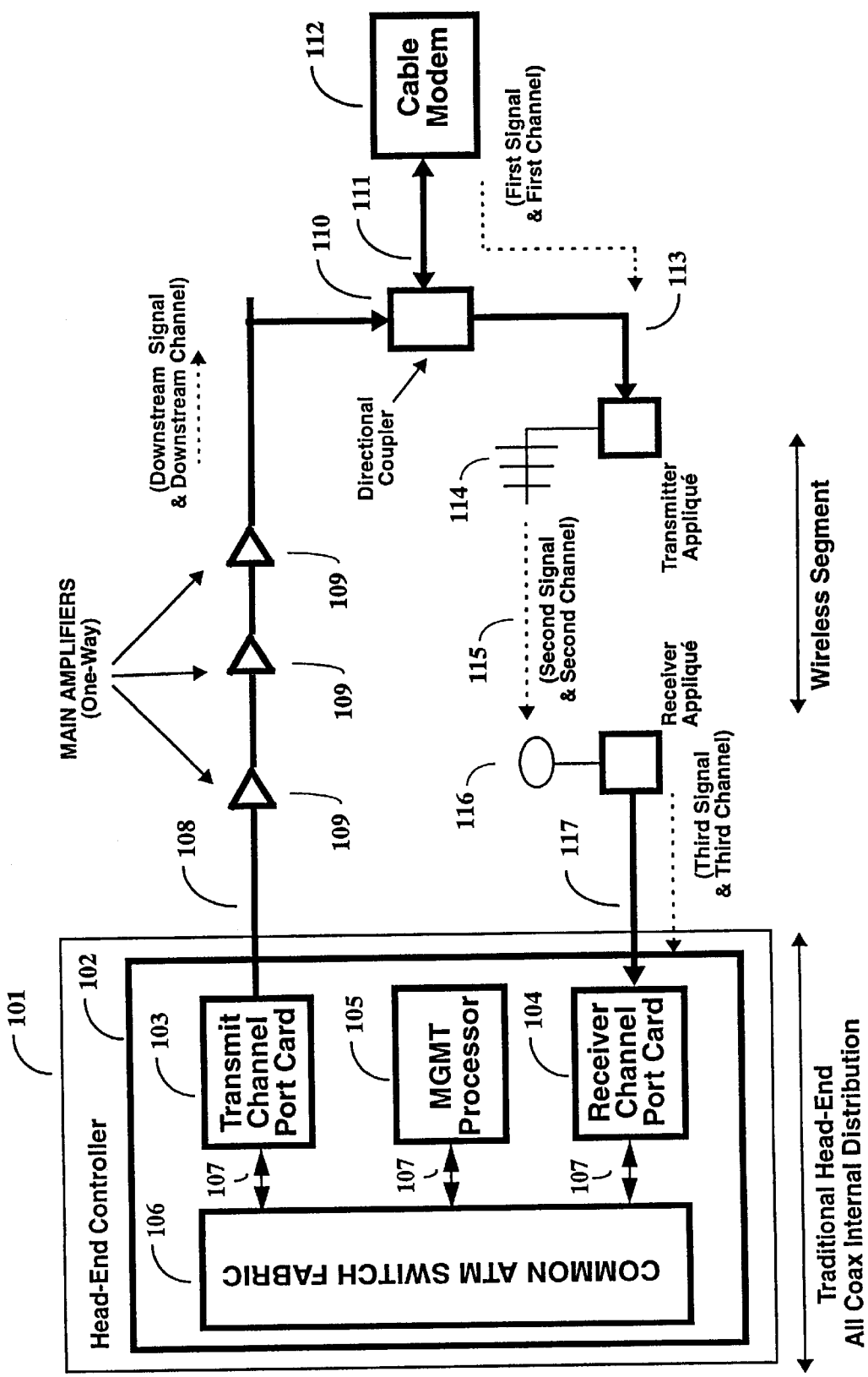
FIG. 1 shows a block diagram of a standard one-way cable TV network that also has a single radio return link for enabling two-way communications.

A method and apparatus for converting a traditional one-way cable system into a two-way system by utilizing an over-the-air radio frequency (RF) return path to provide upstream communications is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

In order to provide a more thorough understanding of the present invention, definitions of terminology is given below:

A Cable Television Network is also known as a Community Access Television (CATV) network. It consists of a traditional coaxial cable tree and branch or Hybrid Fiber-Coax (HFC) network. The downstream signals and downstream channels originate from a CATV head end (or headend). The upstream signals and upstream channels terminate in the CATV headend. Typical CATV signals enter and exit the headend via coaxial cable or combinations of coaxial cable and amplitude modulated (AM) optical fiber. It is envisioned that future CATV distribution systems will incorporate the individual or combined use of either traditional coaxial cable, AM modulated optical fiber, digitally modulated optical fiber, or wireless "last drop" systems. Further, wiring in a headend typically uses traditional coaxial cabling for interconnecting equipment and distribution systems within the headend; it is envisioned that future wiring may consist of individual or combinations of coaxial cable, AM fiber, digital fiber, or wireless techniques.

A HeadEnd Digital Communications Controller or Headend Controller is a device located in the CATV headend responsible for mastering the communications between itself and a plurality of cable modems. The headend controller is responsible for managing downstream and upstream bandwidth resources which have been assigned to a cable modem service. A downstream channel is serviced by a transmitter port card located within the headend controller. An upstream channel is serviced by a receiver port card located within the headend controller. A port card may service one or more channels. A headend controller may simultaneously provide service and control one or more downstream channels and one or more upstream channels.

A cable modem is a device typically located at the home of a CATV network subscriber. A cable modem receives information and instructions via signals received on the downstream channel by the headend controller. A cable modem transmits information and replies via signals on an upstream channel to the headend controller. Typical CATV signals enter and exit the cable modem via coaxial cable. It is envisioned that future cable modems incorporate the individual or combined use of either traditional coaxial cable, AM modulated optical fiber, or digitally modulated optical fiber.

The headend controller and the cable modem provide a communication systems bearer service based on Asynchronous Transfer Mode (ATM) networking, which in turn, supports the bi-directional exchange of high speed digital data between the headend controller and the cable modem. The high speed digital data may represent Internet Protocol (IP) data or other Local Area Network (LAN) or Wide Area Network (WAN) data; it may represent digital audio used for interactive voice telecommunications; it may represent digital video used for one-way or two way television; or it may represent specialized data used for individual applications, such as interactive gaming communication.

A downstream signal embodies both a modulation and demodulation means by which digital information is encoded in a downstream form suitable for transmission over the downstream transmission segment media, transmitted by the headend controller, and ultimately decoded in a manner suitable for reception and processing by the cable modem. The downstream form is one or a combination of a common variety of modulation techniques suited to the transmission medium such as, but not limited to, Quadrature Phase Shift Keying (QPSK), Quadrature Amplitude Modulation (QAM); or other advanced modulation techniques such as, but not limited to, Code Division Multiple Access (CDMA), Spread Aloha, or other orthogonal based system such as Discrete Multitone (DMT); or other technique suitable to modulating signals through optical fiber; or other technique suitable for wireless last-drop systems. A downstream distribution system may provide conversion from one downstream media to another, on a segment by segment basis. One example is coaxial cable in the headend, to AM fiber (in an HFC system) and back to coaxial cable.

A downstream channel embodies the spectral bandwidth, frequency, and other spectral characteristics required for transmitting and amplifying a downstream signal through the downstream media.

An upstream signal embodies both a modulation and demodulation means by which digital information is encoded in an upstream form suitable for transmission over the upstream transmission segment media, transmitted by the cable modem, and ultimately decoded in a manner suitable for reception and processing by the headend controller. The upstream form is one of or a combination of a common variety of modulation techniques suited to the transmission medium such as, but not limited to, Quadrature Phase Shift Keying (QPSK), Quadrature Amplitude Modulation (QAM); or other advanced modulation techniques such as, but not limited to, Code Division Multiple Access (CDMA), Spread Aloha, or other orthogonal based system such as Discrete Multitone (DMT); or other technique suitable to modulating signals through optical fiber. An upstream distribution system may provide conversion from one upstream media to another on a segment by segment basis. One example is coaxial cable in the home, to AM fiber in the upstream distribution network, and back to coaxial cable in the headend.

A upstream channel embodies the spectral bandwidth, frequency, and other spectral characteristics required for transmitting and amplifying an upstream signal through the upstream media.

A transmitter appliqué, also called a conventional transmitter appliqué, is an apparatus which receives a first upstream signal on a first upstream channel, and applies a straightforward and consistent heterodyne conversion to produce a second upstream signal on second upstream channel. Where the second upstream signal and second upstream channel are suitable for transmission over a wireless over-the-air radio link segment. The conversion system is essentially a block conversion process where a first set of channels, called the first channel group are block shifted by a delta frequency to channels contained within a second channel group, and where there is a mapping from each first channel in the first channel group to one second channel selected from the second channel group; preferably a one to one mapping. No additional information is encoded in the second signal by the conversion process. In the case of the simultaneous reception of one more sets of first upstream signals and first upstream channels, the conversion produces a corresponding unambiguous second upstream signal and second upstream channel for each first upstream signal and first upstream channel received.

A receiver appliqué, also called a conventional receiver appliqué, is an apparatus which receives a second upstream signal on a second upstream channel via a wireless over-the-air radio link segment, and applies a straightforward and consistent heterodyne conversion to produce a third upstream signal on a third upstream channel. The conversion system is essentially a block conversion process where a set of second channels, called the second channel group are block shifted by a delta frequency to third channels contained within the third channel group, and where there is a mapping from each channel in the second channel group to one channel selected from the third channel group; preferably a one to one mapping. Further, where a third signal on a third channel is received by a receiver port card in the headend controller. It is a novelty of this invention that the block shift delta frequency may be different for each receiver appliqué, where the block shift delta frequency is selected to overcome engineering deployment issues when multiple receiver appliqués are used within a serving area. In this case, the first channels in the first channel group will be selected and process to produce third channels is a third channel group such that each third channel is received by a receiver port card in the head end controller.

An advanced transmitter appliqué, also called an addressable transmitter appliqué, is a moderate cost apparatus which receives a first upstream signal on a first upstream channel, and applies a conversion and coding process to produce a second upstream signal on second upstream channel. Where the second upstream signal and second upstream channel are suitable for transmission over a wireless over-the-air radio link segment. The conversion process adds sufficient additional identification information based on the received first channel or other provisioning, such as but not limited to as ID code tagging or CDMA PN coding, sufficient to unambiguously identify which transmitter appliqué is sending the second signal on the second channel or which receiver appliqué is to uniquely receive the second signal on the second channel. In the case of multiple second channels, the conversion process uses a mapping from each first channel in the first channel group to a corresponding second channel selected from the second channel group; preferably a one to one mapping. In the case of the simultaneous reception of one more sets of first upstream signals and first upstream channels, the conversion produces a corresponding unambiguous and identified second upstream signal and second upstream channel for each first upstream signal and first upstream channel received.

An advanced receiver appliqué, also called an addressable receiver appliqué, is a moderate cost apparatus which receives an identified second upstream signal on a second upstream channel via a wireless over-the-air radio link segment and selects whether or not to convert the second signal based on the encoded identification. For second signals which are to be converted, the appliqué applies a conversion and decoding process based on the received second channel or on the encoded identification to produce a third signal on a third channel suitable for reception by a receiver port card on the headend controller. The advanced receiver appliqué conversion process removes any additional identification information from the second signal or second channel. In the case of multiple second channels, the conversion process uses a mapping from each second channel in the second channel group to a corresponding third channel selected from the third channel group; preferably a one to one mapping. In the case of the simultaneous reception of one more sets of second upstream signals and second upstream channels, the conversion produces a corresponding unambiguous third upstream signal and third upstream channel for each second upstream signal and second upstream channel received and selected for conversion.

The identification encoding and decoding used by the advanced transmitter appliqué and the advanced receiver appliqué may be based on one of several techniques such as but not limited to use of a special or unique preamble pattern in a transmission burst; prepending a unique sequence of preamble and/or data bytes containing an identification code; or transmitting a signal in a Code Division Multiple Access (CDMA) system using a unique PN code to provide the identification.

A wired cable modem, is a cable modem whose upstream path consists exclusively of one or more wired media segments and includes no wireless over-the-air media segments.

A wireless cable modem, is a cable modem whose upstream path consists of one or more wired media segments and at least one transparent wireless over-the-air media segment.

Basically, starting with a two-way cable modem situated at a residence or office, a transmitter appliqué is attached that converts an upstream modem signal on a coaxial line (e.g., in the 5–42 MHz band) into a frequency range suitable for over-the-air radio transmission to the cable head end or to one or more intermediate points. It should be noted that the terminology, two-way cable modem, as used in this patent and interpreted in the claims, is not to be limited to just Internet Protocol (IP) modems, but also includes all types and variations of subscriber terminal units (STUs), interactive set-top boxes, integrated service packages, etc. Furthermore, it is contemplated that different frequencies ranges may be applied to the present invention. For instance, the selected radio channel can be one that is suitable for transmission without the necessity of separate FCC licensing, such as the frequency ranges 902–928 MHz. or 2400–2483.5 MHz or 5725–5850 MHz. At the cable head end, an inverse transformation is performed, shifting the received band back to the 5–42 MHz range where the received signal can be processed by a conventional head end controller. A more detailed description of the superheterodyning procedure is found in the patent application entitled "CONVERSION OF A CABLE MODEM SIGNAL TO DIFFERENT FREQUENCIES FOR UPSTREAM COMMUNICATIONS HAVING A WIRELESS CHANNEL SEGMENT," filed Mar. 4, 1997, Ser. No. 08/811,186.

It should be noted that some cable plants are presently partially activated. That is, reverse amplifiers are activated on some trunks to support remote monitoring equipment but not the feeders connecting the subscribers. In such cases, it would not be necessary to bring the upstream signals back to the head end solely by radio. Rather, a mixture of upstream cable plus over-the-air radio can be used with the conversion back to the 5–42 MHz band accomplished by heterodyning downconverters located on the activated return trunk. Thus, the over-the-air upstream signals are then sent upstream to the STUs at the cable head end partially via the cable. It should also be noted that since neither the frequency nor the precise modulation used is modified by the currently preferred embodiment of the present invention, the conversion from the radio path signal to the signal on the cable is readily implemented simply by a matched frequency translation. Moreover, while the purpose of using the radio path is to defer the expense of insertion of diplexing filters and reverse amplifiers until enough users are present to justify the common expenditure of the plant upgrade, there will be instances where the over-the-air radio path alone will suffice and the full conversion of the one-way cable plant to two-way operation by the addition of diplexers, filters, and amplifiers is indefinitely deferred.

FIG. 1 shows a block diagram of a standard one-way cable TV network that has been upgraded according to the present invention with a radio return link for enabling two-way communications. A traditional head end cable TV network is shown as 101. It consists of a headend digital communications controller 102 for controlling all digital data traffic, both upstream and downstream. The head-end controller 102 is comprised of a common asynchronous transfer mode (ATM) switch fabric 106 which provides point-to-point switching capabilities. A transmit channel port card 103 is connected to the switch fabric 106 via bus 107. The transmit channel port card 103 is used to transmit downstream signals over a standard one-way coaxial cable distribution network 108 at a given downstream frequency. A number of distribution or main amplifiers 109 are used to provide the requisite gain. The downstream signals are then routed through a directional coupler 110 and coax 111 to a cable modem 112.

On the upstream side, cable modem 112 transmits signals on an upstream channel having a first frequency. These upstream signals are routed back through coax 111 and directional coupler 110 to a transmitter appliqué 114 on line 113. The upstream signals are then up converted by transmitter appliqué 114 to an upstream channel having a second frequency. This upconverted signal is then transmitted by the antenna as radio over the airwaves to a receiving antenna connected to a receiver appliqué 116. The receiver appliqué 116 down converts the radio signal back down to an upstream channel having a third frequency. In many cases, the first upstream frequency is the same as the third upstream frequency. The downconverted received signals are then dropped onto cable 117. Cable 117 is connected to receiver channel port card 104. A management processor 105 is used to control the overall transmit/receive process.

Figure 2:
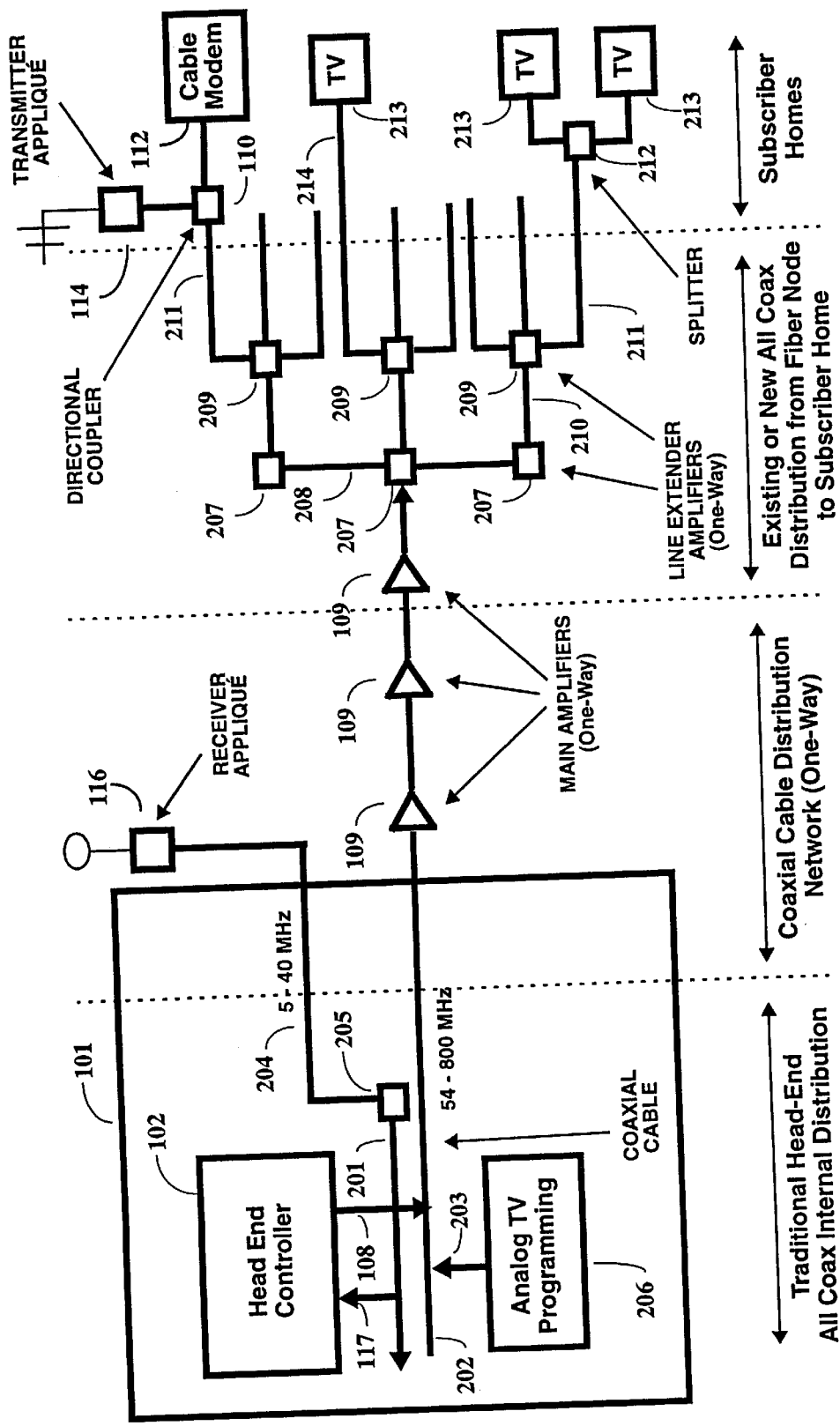
FIG. 2 shows a block diagram of a CATV network that has a radio return path as well as a standard coaxial cable path for enabling upstream communications.

FIG. 2 shows a block diagram of a standard one-way cable TV network that has been upgraded according to the present invention with a radio return link for enabling two-way communications. It can be seen that part of the CATV network can be comprised of standard one-way set-top boxes with no upstream capability; part can be upgraded with two-way cable modems utilizing an all-coax upstream path; and part can be upgraded with two-way cable modems utilizing appliqué/antennas for an over-the-air upstream path. Furthermore, the delineation between the various stages of a traditional headend all coax internal distribution, one-way coaxial cable distribution network, existing or new all coax distribution, and subscriber homes/offices is shown in this figure.

A traditional head end cable TV network is shown as 101. It consists of a headend digital communications controller 102 for controlling all digital data traffic to the downstream coaxial cable distribution network 202 via coaxial link 108. A standard analog TV programming source 206 also places an NTSC video signal onto the coaxial cable distribution network 202 via coax 203. A number of distribution or main amplifiers 109 are used to provide the requisite gain. Thereupon, the downstream signals are fed into one or more one-way line extender/bridging amplifiers or junctions 207–209, which route the signals to the appropriate destinations. For example, a standard one-way set-top box/TV arrangement is shown as 213. Downstream signals are routed through interconnecting coupler 207, coax 210, coupler 209, coax 211, and splitter 212.

The cable modem 112 is two-way enabled. For its upstream side, a directional coupler 110 routes upstream signals from a two-way cable modem 112 to the transmitter appliqué 114. The transmitter appliqué 114 can be placed adjacent to the cable modem 112. Alternatively, transmitter appliqué 114 may be situated in a remote location a distance away from the cable modem 114. Furthermore, there may be instances whereby multiple two-way cable modems share one or more transmitter appliqués. The upstream signal is up converted by transmitter appliqué 114 and transmitted by the antenna as a radio signal propagated over the airwaves to a receiving antenna connected to a receiver appliqué 116. The transmitting antenna can be one of any directional antenna configurations used for transmitting RF signals. Note that directional antennas, particularly those having a high front to back ratio are especially useful for practice in the present invention. Furthermore, the transmitting antenna may be mounted on a subscriber's window or remotely situated, such as on a telephone pole, depending on convenience and line-of-sight considerations.

Receiver appliqué 116 down converts the radio signal back down to the 5–40 MHz frequency range and drops it onto cable 204. Cable 204 is connected into coupler 205 which routes the signal to the head end controller 102 on line 117. It should be noted that the cable modem 112 can selectively adjust its upstream power level to insure that the signal arrives at an optimum level at the head end modem. In the currently preferred embodiment, the same protocol and data format is used with the radio return as is used by the upstream coaxial cable system. By using the same acquisition, ranging, QPSK modulation, and TDMA slotted approach for both radio and coax cable upstream paths, the cable network can be selectively upgraded. A further embodiment of this invention places the upstream transmitter appliqué within or adjacent to a line extender, feeder, or trunk amplifier, to allow spanning over the presently one way parts of a mixed one way and two way cable system. This allows several subscribers may share a single upstream appliqué unit.

Figure 3:
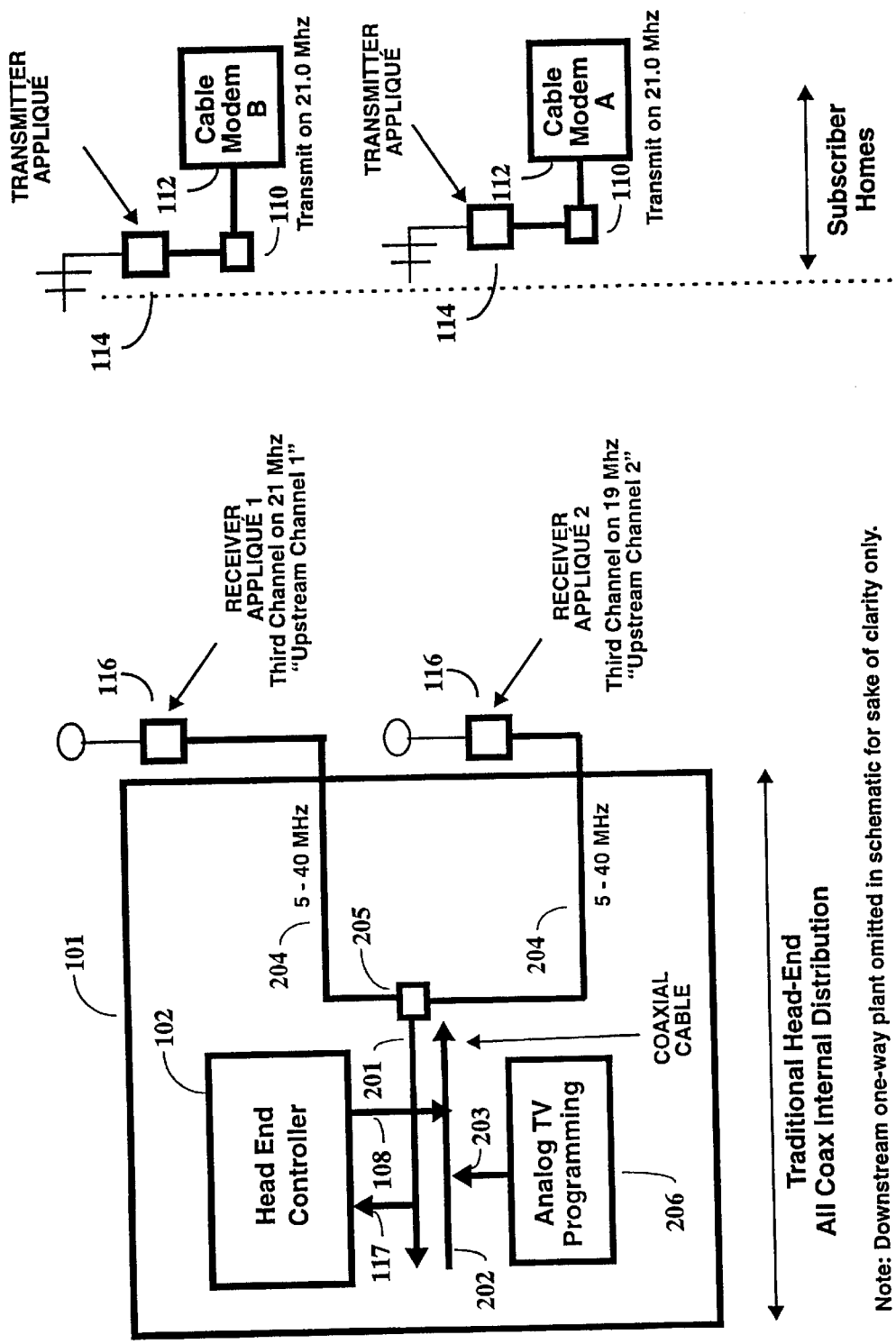
FIG. 3 shows a schematic diagram of a one way cable TV system with multiple antenna/appliqués for establishing multiple radio return links.

FIG. 3 shows a schematic diagram of a one way simultaneous parallel cable TV system with multiple receiver antenna/appliqués for establishing multiple radio return links. Each cable modem 112 having the capability of transmitting a radio return can transmit its individual upstream radio signal by means of its dedicated transmitter appliqué 114. The down converted RF signals from these STUs are returned to the cable head-end via limited deployment upstream enabled cable plant. For example, the down-converted signals from the multiple receiver appliqués 116 are coupled to cable 201 by coupler 205 via lines 204. From coupler 205, the received signals are sent to the head end digital communications controller 102 via line 117. In the case of one deployed receiver appliqué, signals received from one or more STUs are scheduled based on a time domain multiple access method which provides a slotting method on the upstream channels. Thereby, this provides multiple access to a plurality of STUs which may be using the upstream radio link. Moreover, due to normal RF propagation characteristics at the frequencies which may be used by this invention, practical deployment of the radio return systems might mandate the use of one or more receiver antennas/appliqués 116 placed at appropriate geographic positions within the cable TV network distribution area for improved reception. In the case of multiple receiver appliqués, each receiver device may down convert, each using a different offset, thereby "spreading" received quadrature phase shift keying (QPSK) data bursts across a known set of receiver frequencies that are monitored by the head-end controller 102. Further, the cable modem system's management functions include a method for adjusting the RF power output of the cable modem, thereby controlling the power output of the transmitter appliqué 114. The system adjusts the cable modem's power such that QPSK bursts are received by a minimum number of receiver appliqués.

Figure 4:
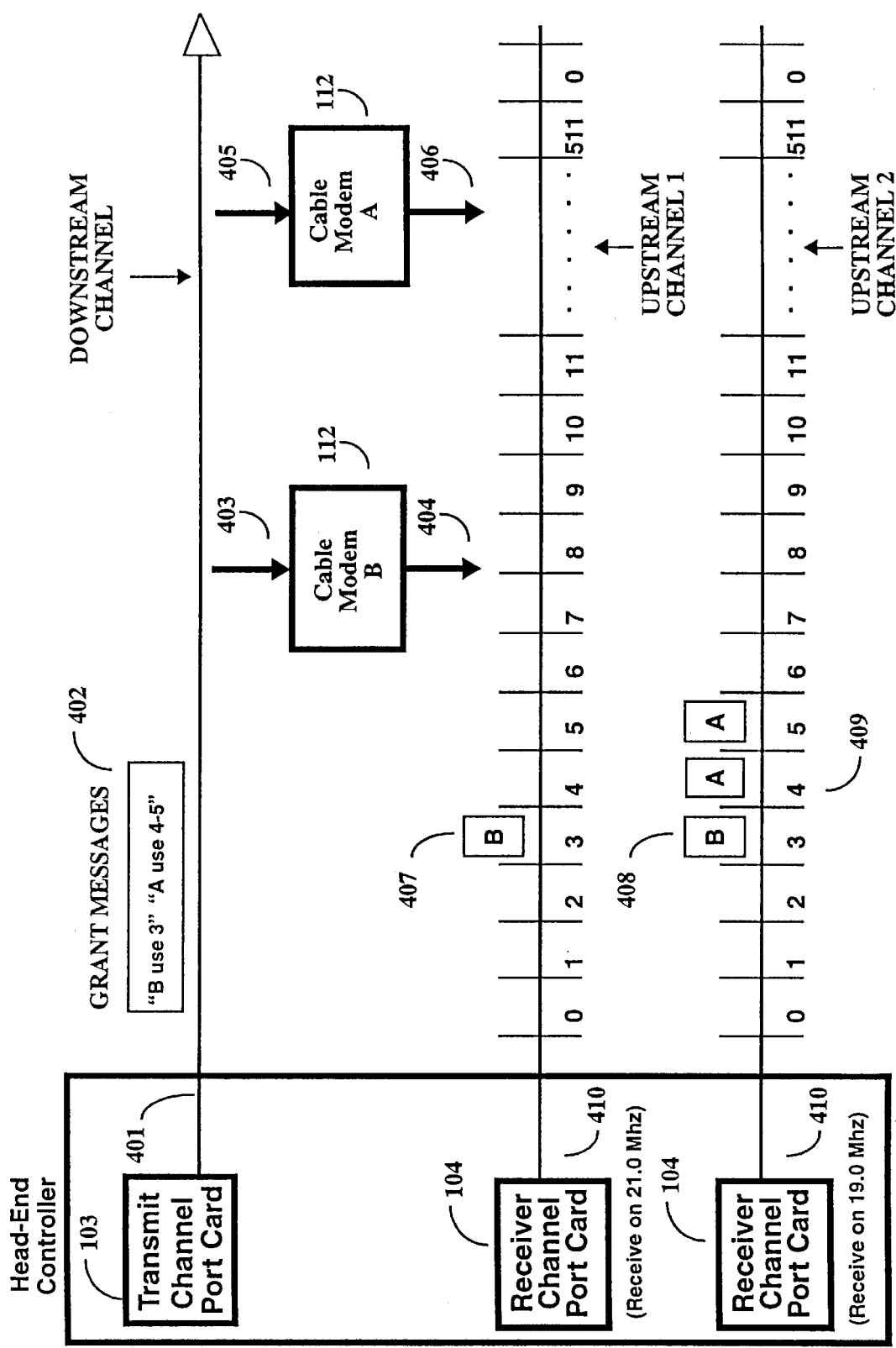
FIG. 4 illustrates burst transmissions from an STU being received simultaneously by two radio return links.

Protocols for establishing upstream transmissions are well known. However, over-the-air upstream transmission path aspects of the present invention are novel and not obvious, even in light of the existing protocols. For purposes of explanation, a protocol establishes how to handle the signing on, acquisition, and ranging of cable modems. (See, for example, "The UPSTREAMS Protocol for HFC Networks" by Mark Laubach, submitted to the IEEE 802 LAN/WAN standards committee, IEEE 802.14 Cable TV MAC and PHY Working Group, contribution number IEEE802.14-95/ 152, Oct. 23, 1995). One exemplary protocol is demonstrated in FIG. 4 which shows how burst transmissions from a cable modem being received simultaneously by more than one radio return links are handled. For the downstream side, a transmit channel port card 103 in the head end controller 102 transmits a common downstream channel signal on coax 401. This signal is received by cable modem A via path 405 and also by cable modem B via path 405. On the upstream side, the signals output from the transmitter appliqués associated cable modems A and B are transmitted by radio over paths 404 and 406, respectively. However, the transmitter appliqués down convert their respective signals at slightly offset frequencies (e.g.,). In turn, individual receiver channel port cards 104 are each tuned to a specific frequency (e.g., 21.0 MHz or 19.0 MHz) of one of the received channels 410. This allows for the channelization of the upstream data and frequency diversity. It is desirable that adjacent clusters of users should operate at different frequencies. Furthermore, enhanced frequency separation may be aided, if desirable, by operating some sites with one antenna polarization and likely co-channel interferes at an orthogonal polarization.

In addition, a TDMA-like slot structure is created for the upstream channel, creating a frameless stream of ATM cell slots. These slots may be assigned for the transmission of ATM cells from either of the cable modems A or B. The slots on the upstream channel are on the order of approximately 200 microseconds and are numbered in ascending order beginning at 0 up to 511 (decimal) and then the count is repeated starting at 0. Techniques for ranging the cable modems produce a timing alignment condition such that if two cable modems are both instructed to simultaneously transmit an ATM cell in the same slot, the first bit from each cable modem transmission would arrive at the head end receiver port cards 104 at the same time. This ranging/ slotted scheme enables the head end controller 102 to schedule transmissions by issuing grant messages to the cable modems A and B. The contents of the grant message contain individual grants that are directed to specific cable modems. In this embodiment, the Grant Messages mechanism 402 can be extended to an arbitrary number of individually identified cable modems which receive messages via the same downstream channel 401 such that sharing of the slotted upstream channel 410 is accomplished under direction of grants being issued from the head end controller 102. For example, grant messages 402 can assign cable modem A to use slots 4 and 5, whereas cable modem B is assigned slot 3. In most instances, however, timing of response should be staggered so that there is maximum physical separation of co channel users.

Unfortunately, there may be instances where two receiver channel port cards receive the same transmission from a single cable modem's transmitter appliqué. For example, the same burst message from cable modem B might be received in two different channels (shown as 407 and 408). Hence, a duplication suppression circuit must be incorporated to detect and remove the duplicate QPSK data bursts that may be received by the plurality of receiver appliqués. There are many different techniques which may be used to remove duplicate data bursts. One technique is to implement clocked buffers as described with reference to FIG. 5 below.

Figure 5:
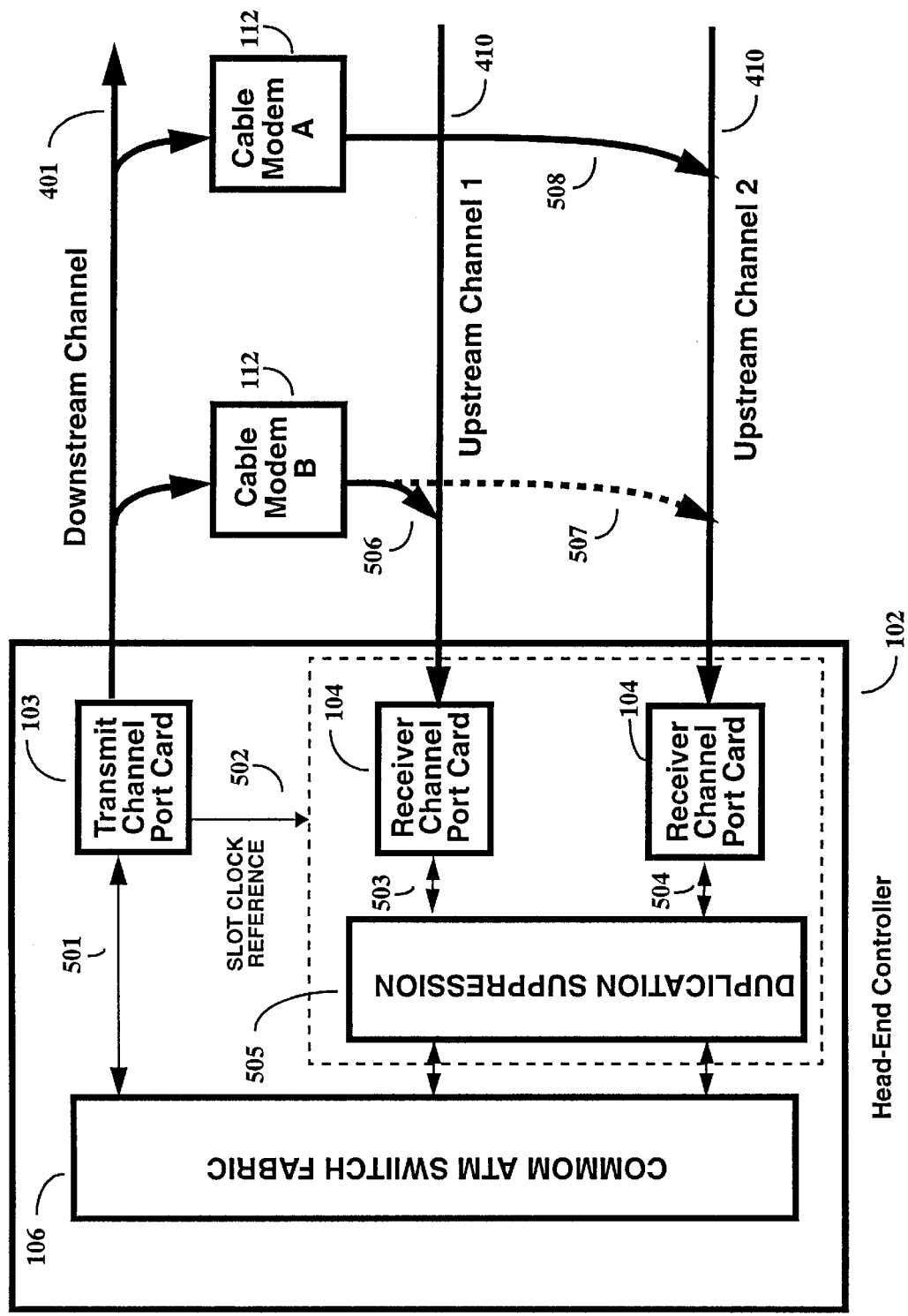
FIG. 5 shows a schematic diagram of a two way cable TV system having a duplicate burst suppression function.

FIG. 5 shows a schematic diagram of a two way cable TV system having a duplicate burst suppression function. As shown, cable modem A's burst message is properly picked up in slots 4 and 5 of upstream channel 2 via path 406. Cable modem B's burst message is properly picked up in slot 3 on upstream channel 1 via path 505. However, the same burst message is inadvertently picked up at the same time on upstream channel 2, as indicated by the dashed path 507. This problem is resolved by the duplication suppression circuit 505 which is comprised of clocked buffers. The duplication suppression circuit 505 is clocking its buffers at the same rate as that of the incoming slots. The clocking is performed according to a slot clock reference signal 502 generated by the transmit channel port card 103. Consequently, the duplicate suppression process is performed at the same rate as the TDMA slot cycling. In any given slot, the duplication suppression circuit 505 checks each of its buffers to determine whether there are any duplicate packets by performing a parallel compare. If any duplicate packet(s) are detected, they are simply cleared from that buffer, while retained packets are forwarded on to the common ATM switch fabric 106. Note that with this approach, the head end knows which burst message originated from which of the multitude of STUs with requiring any of the STUs to include tag information for identification purposes. Hence, one of the unique and novel benefits offered by this approach is that by performing most of the tasks at the head end, the attendant STUs and appliqués can be instituted simply, effectively and yet, at a very low-cost.

Figure 6:
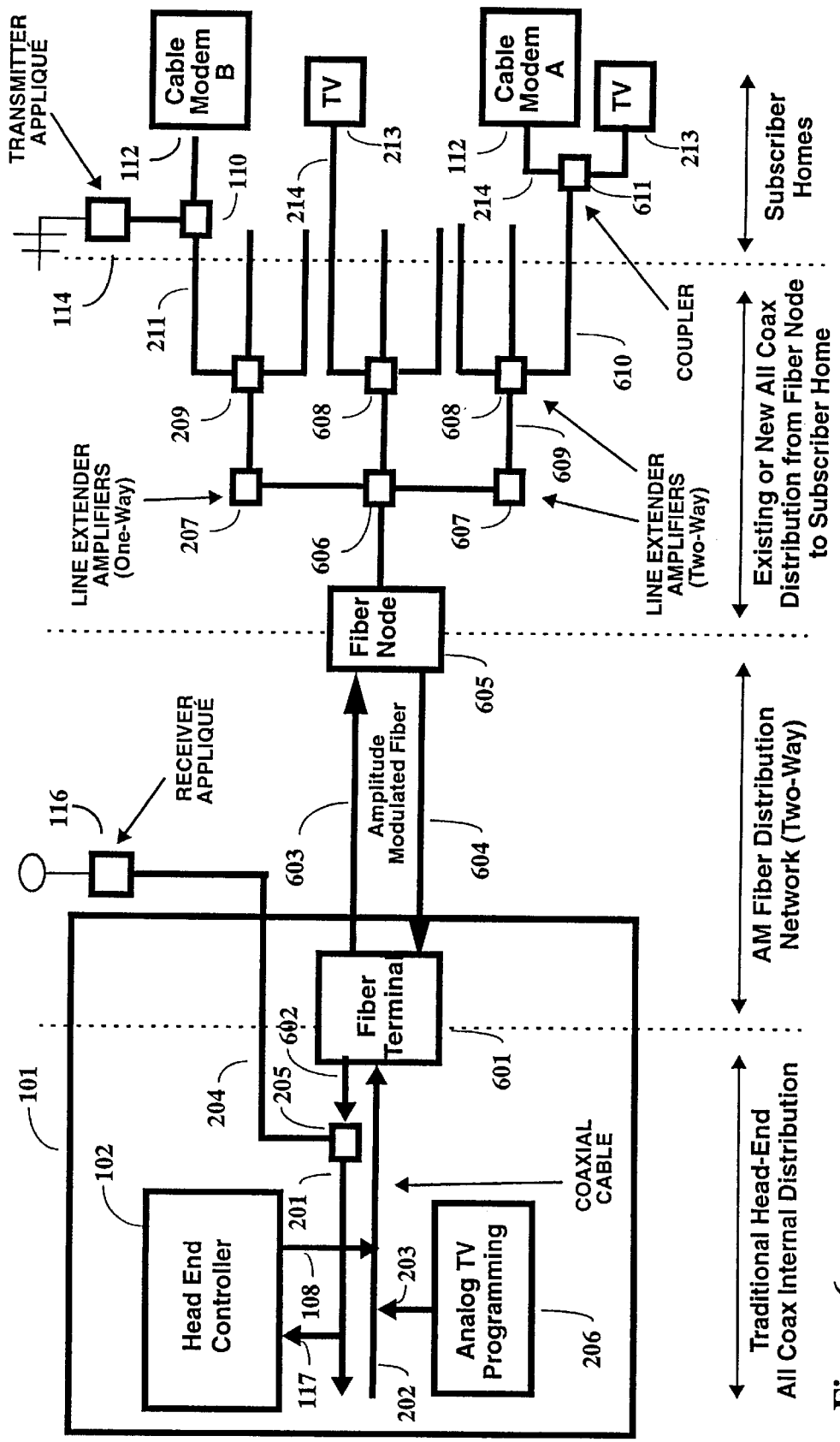
FIG. 6 shows a schematic diagram of a hybrid fiber-coax cable TV distribution system feeding both one way and two way cable distributions.

By implementing the same protocol used in the radio return as that used in an upstream cable return, the present invention can be readily adapted to a two way hybrid system having both radio and cable return paths. FIG. 6 shows a schematic diagram of a hybrid fiber-coax cable TV distribution system feeding both one way and two way cable distributions. As shown, part of a CATV network has been upgraded using hybrid coax technology to provide two way coax functionality. The two way coax feature is accomplished by means of implementing a fiber terminal 601 within the head end unit 101. Thereby, on the down stream side, signals from the head end controller 102 and analog TV programming are fed into the fiber terminal 601 through path 202. An amplitude modulated fiber 604 transmits the signal to a fiber node 605 which feeds the coax distribution network. An interactive cable modem A is installed at the subscriber's location. New two way line extender amplifiers 606–608 are installed to handle upstream signals transmitted from cable modem A back through the coax distribution system. Such upstream signals are routed through fiber node 605 to fiber terminal 601 on line 604, and then through combiner 205 on line 602 to the head end controller 102 via path 201 and 117.

In contrast, the top part of the diagram shows a conventional CATV system whereby couplers 207 and 209 remain the old one way type. Downstream signals are conducted the old fashioned way to an interactive cable modem B. However, on the upstream side, cable modem B utilizes a radio return to transmit its burst messages. This is accomplished through directional coupler 110, appliqué 114, and a transmitting antenna. A receiving antenna picks up the radio signal which is down converted by receiver appliqué 116. Note that more than one receiving antenna may be used. The down converted signal is then combined with other upstream signals present on line 602 by combiner 205. At this point, all upstream channels (i.e., radio return and fiber coax return) are sent along to the head end controller 102 via path 117.

Figure 7:
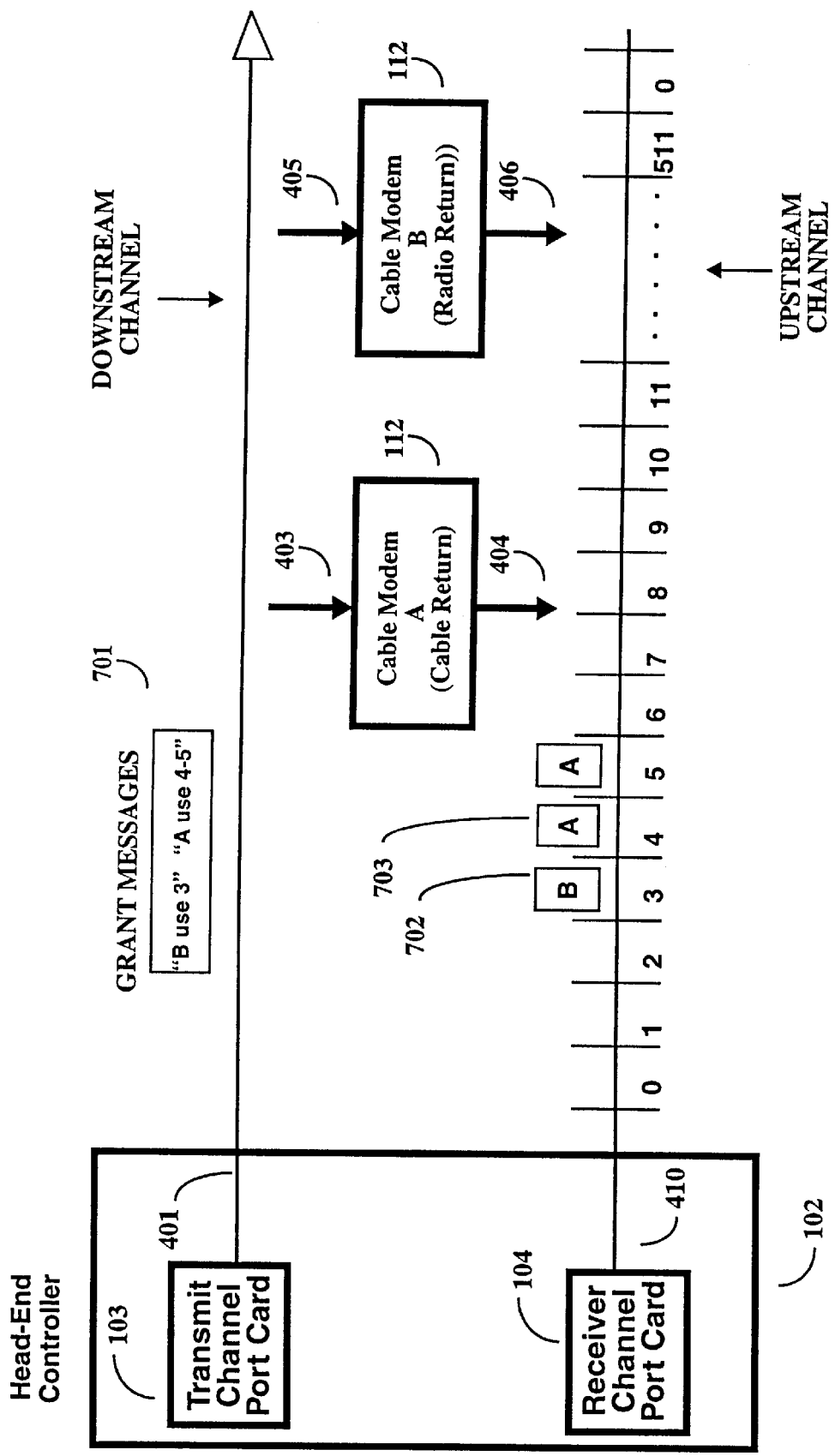
FIG. 7 shows a time domain scheduling of a radio return and a cable return transmission on the same receiver channel.

FIG. 7 shows a time domain scheduling of a radio return and a cable return transmission on the same receiver channel. The ranging process specified by the protocol is based on propagation delay times. If a cable modem has a longer delay time, it is deemed to be located further away. Conversely, a cable modem with a shorter delay is deemed to be closer. The head end unit uses this ranging information to compensate the TDMA slotting process to ensure that the proper burst messages are sent over the appropriate assigned slots. (See "The UPSTREAMS Protocol for HFC Networks" cited above). Consequently, it becomes inconsequential whether a cable modem utilizes a cable return or a radio return; both mediums are automatically slot synchronized due to the ranging process. In the example shown, cable modem A utilizes a cable return to transmit burst messages in slots 4 and 5 according to the grant message 701. Cable modem B, employing a radio return, transmits on slot 3 according to the grant message 701. All three message bursts on slots 3–5 from two different cable modems (cable modem A employing a cable return and cable modem B employing a radio return), exist on a single channel 410, which is sent to receiver channel port card 104. Thus, the head end controller is just as capable of scheduling messages for all cable returns, all radio returns, or a combination thereof. In other words, this synchronization scheme enables QPSK bursts, as received by the head-end equipment, to be intermixed from cable modems which are transmitting directly on the cable TV network distribution plant (i.e., not over the radio link, with transmissions from modems that are using the upstream radio link). This mixed mode feature allows the cable operator to selectively upgrade the cable TV distribution plant for upstream capability. The same cable modems may be used for either wired or wireless operation. In the case of the transition from wireless cable upstream to wired cable upstream, the receiver appliqué is simply removed and the appropriate coupler or diplexer installed which transmits the cable modem's signals into the cable TV distribution system. This feature allows cable operators to selectively upgrade portions of a standard CATV system without any service disruptions for existing and new users. Furthermore, the upgrades can be implemented by using radio returns, cable returns, or a combination of the two. In addition, the same cable modem hardware can be used for radio as well as cable returns. Only the software need be updated.

Figure 8:
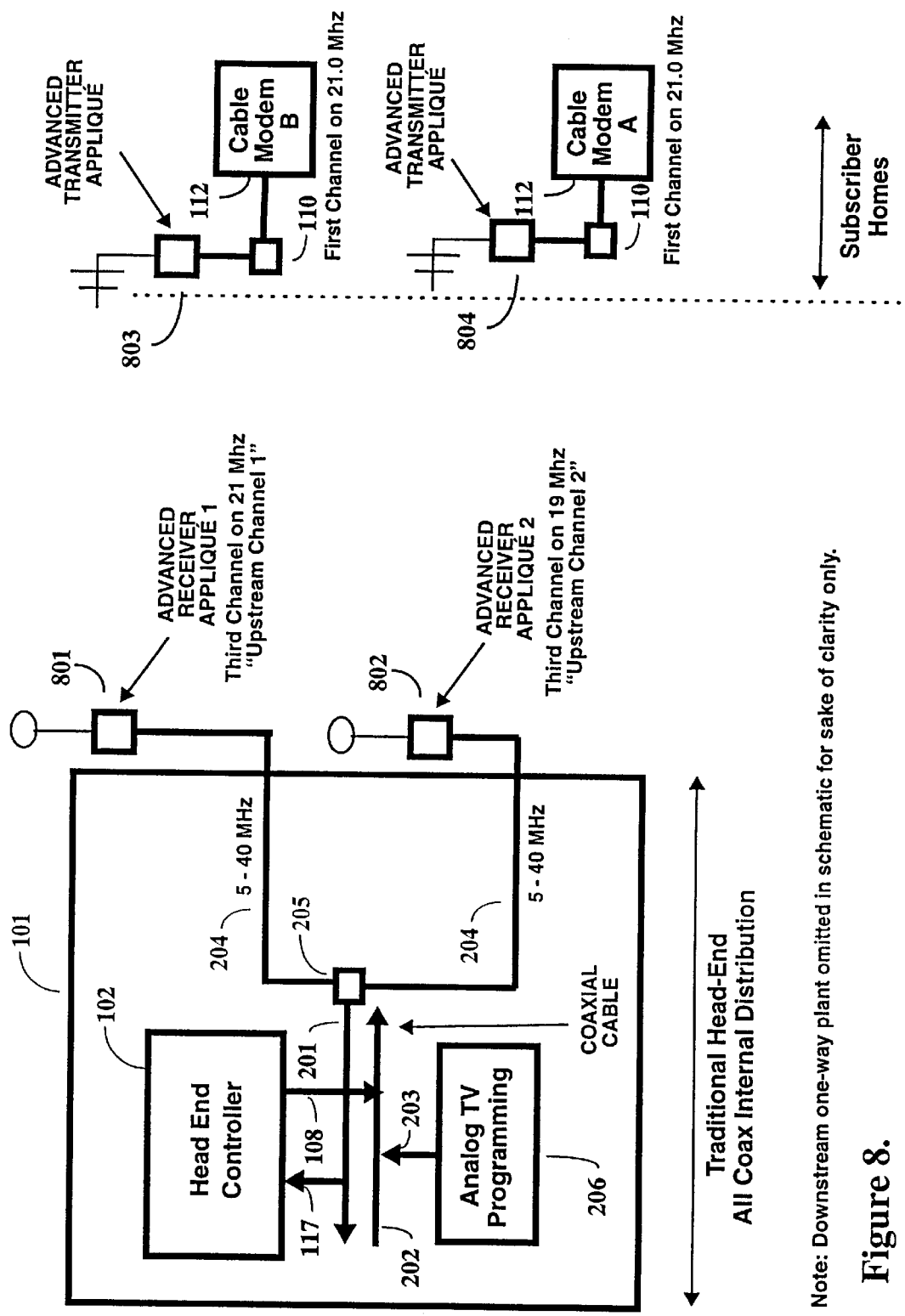
FIG. 8 shows a schematic diagram of a one way cable TV system with multiple advanced transmitter appliqués and multiple advanced receiver appliqués for establishing multiple radio return links.

FIG. 8 shows a schematic diagram of a one-way simultaneous parallel cable TV system with multiple advanced transmitter appliqués and multiple advanced receiver appliqués for establishing multiple radio return links. Each cable modem 112 having the capability of transmitting a radio return can transmit its individual upstream burst by means of its dedicated advanced transmitter appliqué 804. The advanced transmitter appliqué 804 and 803 are each provisioned to encode their second signal produced on the second channel such that only one advanced receiver appliqué 801 or 802 will perform the conversion to the third signal and third channel. For example, the wireless over-the-air transmission from advanced transmitter appliqué 803 is so encoded so that either advanced receiver appliqué 801 or advanced receiver appliqué 802 performs the conversion of the second signal on the second channel to a third signal on a third channel. The third signal and third channel are then conveyed along the remainder of the upstream path, 204, 205, 201, and 117, such that they are received by a receiver port card in the headend controller as was previously described for FIG. 3. This provides multiple access to a plurality of cable modems which may be using the upstream radio link. Moreover, in the case of multiple advanced receiver appliqués, each appliqué may convert to the same third signal but each to different third upstream channel, such that each channel is received by a channel serviced by a headend controller port card. This provides for each receiver appliqué being associated with a specific upstream channel. Moreover, in the case where advanced receiver appliqué 801 is geographically distant from advanced receiver appliqué 802, such that the RF propagation characteristics are strongly in force such that a transmission burst from any advanced transmitter appliqué 803 or 804 can only be physically received by at most one receiver appliqué, then both receiver appliqués 801 and 802 may convert to the same third signal and the same third channel. Consequently, the upstream transmission is received on a signal channel by a single receiver port card in the headend controller. This provides for both frequency reuse, second signal encoding reuse, and also minimizes the number of headend controller receiver channels are needed when the TDMA based protocol can schedule transmissions from the cable modems. Furthermore, this system, as described for FIG. 8, is scalable to a plurality of advanced receiver appliqués and a plurality of advanced transmitter appliqués, operating with one or more upstream receiver channels supported by the headend controller. In addition, this system comprised of advanced transmitter appliqués and advanced receiver appliqués together with wired cable modems, maintains the transparency feature that wired and wireless cable modems can be received on the same upstream receiver channel support by the headend controller. The cable modem system's management functions include a method for adjusting the RF power output of the cable modem, thereby controlling the power output of the advanced transmitter appliqué 803 or 804. The system adjusts the cable modem's power such that the second signal associate with the cable modem is received by at least one advanced receiver appliqué.

Figure 9:
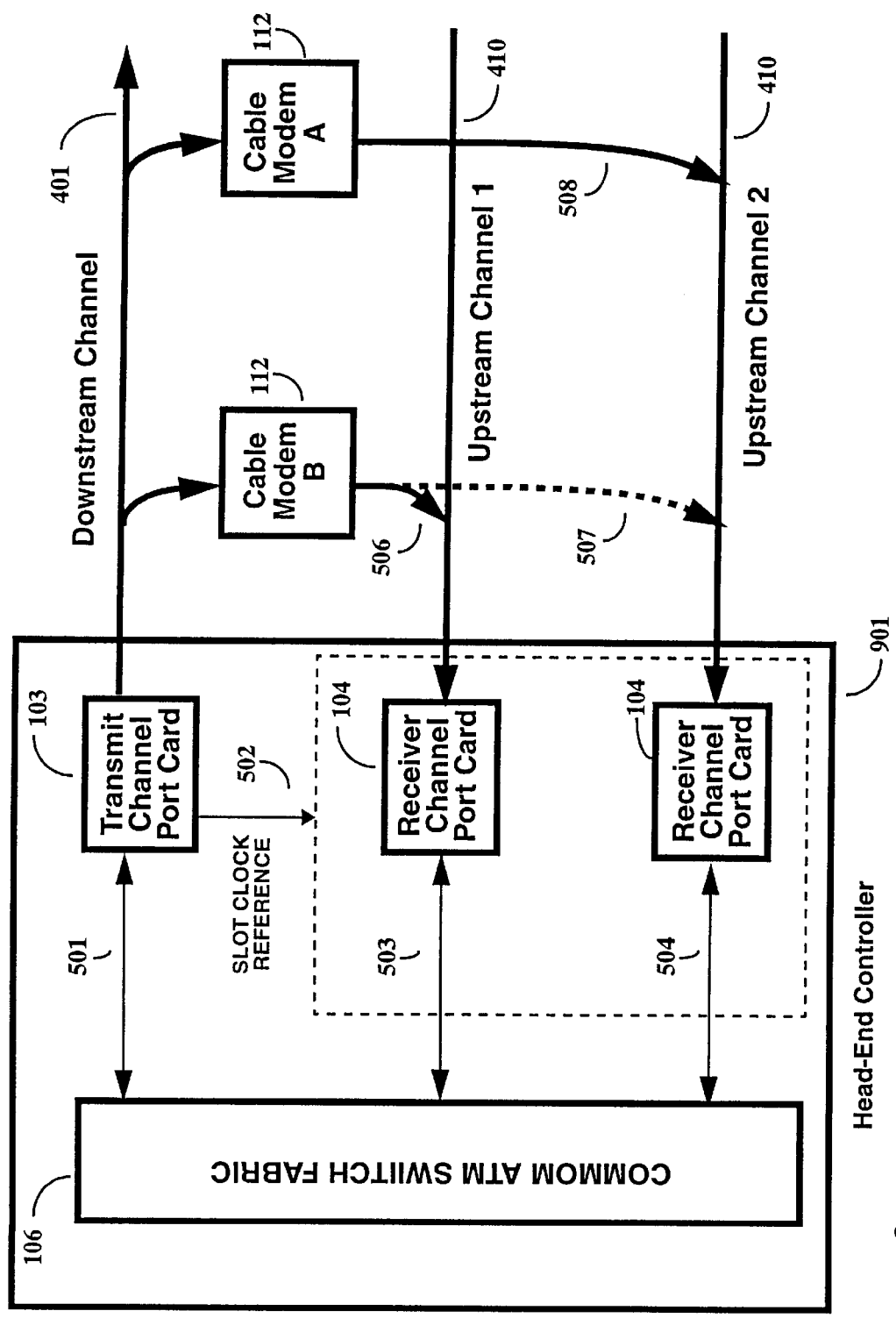
FIG. 9 shows a schematic diagram of a two-way cable TV system and a headend controller that does not require a duplicate burst suppression function.

FIG. 9 shows a schematic diagram of a two way cable TV system that does not have a duplicate burst suppression function in the headend controller 901. Otherwise, the function of the headend controller 102 is the same as that presented in FIG. 5. Further, the head-end controller 102 of FIG. 5 may also be used with advanced receiver appliqués and advanced transmitter appliqués and its presence and function, though made redundant, will not impair proper operation of the system. In a system of mixed convention appliqués and advanced appliqués, the headend controller 102 is required. If the system is comprised only of advanced appliqués, either headend controller 102 or headend controller 901 may be used. Furthermore, a system comprised of conventional transmitter appliqués and conventional receiver appliqués, together with advanced transmitter appliqués and advanced receiver appliqués, along with wired cable modems, maintains the transparency feature that wired and wireless cable modems can be received on the same upstream receiver channel support by the headend controller.

The foregoing descriptions of specific embodiments of the present invention, such as transparency, multiplicity, and channelization, have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A method for wireless communication of digital signal transmission between a source and a plurality of receivers, comprising the steps of:

sending a first digital upstream signal by a cable modem on a first upstream channel;

converting the first digital upstream signal on the first upstream channel to a second digital upstream signal on a second channel;

transmitting the second digital upstream signal on the second channel over the air, wherein only upstream signals are transmitted over the air while downstream signals are transmitted from a head end controller through a cable medium to the cable modem without any wireless segment;

receiving the transmitted first digital signal on the first upstream channel by a receiver from a plurality of cable modems including a cable modem which share a same second upstream channel according to time domain multiplexing;

processing a bitstream signal on a third upstream channel selected from a set of channels in a third channel group, wherein multiple received second upstream channels may be processed simultaneously;

generating a third upstream digital signal from the second digital upstream signal on the third upstream channel selected from the set of channels in the third channel group, wherein there is a one to one correspondence between each channel in a second upstream channel group with each channel contained in the third upstream channel group;

receiving the third upstream digital signal by a head end controller via the third upstream channel assigned to the receivers.

2. The method of claim 1 further comprising the step of receiving the third upstream digital signal by the head end controller through a cable television network via the third upstream channel assigned to the receivers.

3. The method of claim 1 where the processing step is comprised of comparing a plurality of received digital signals to detect duplication.

4. The method of claim 1, wherein the first signal is the same as the third signal.

5. The method of claim 1 further comprising the step of receiving the second signal over the second channel on a plurality of antennas and deleting duplicate received packets.

* * * * *